May 20, 1930.  C. V. CHUPRIN ET AL  1,759,299
LIGHT FOR MOTOR VEHICLES
Filed March 8, 1929
*Fig. 1.*
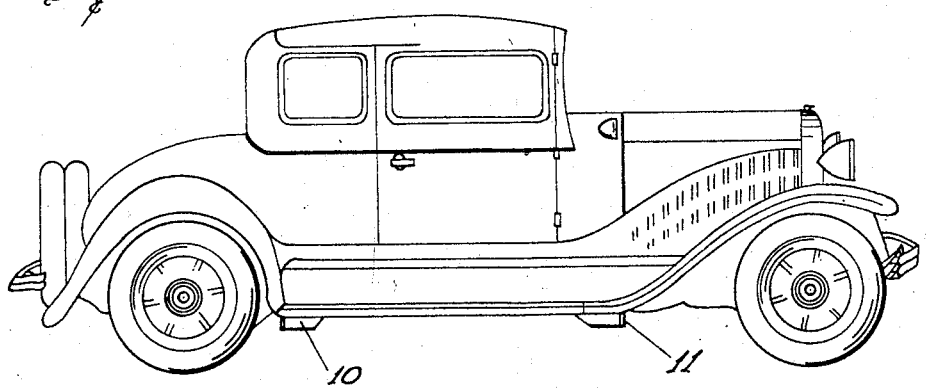
*Fig. 2.*
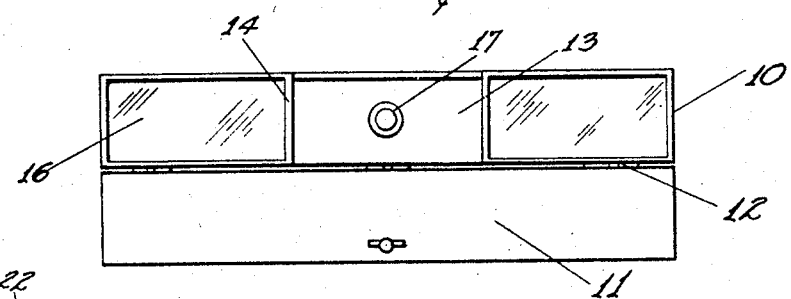
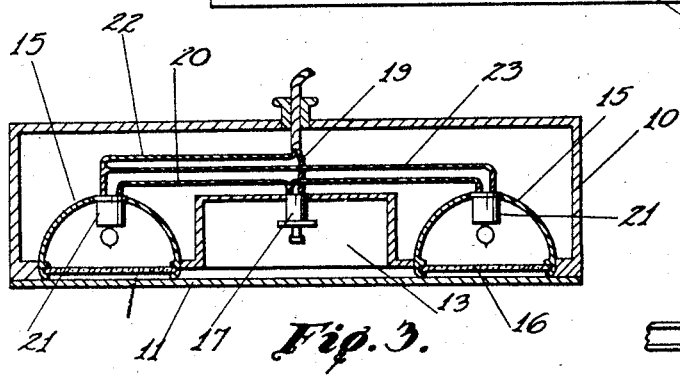
*Fig. 3.*
*Fig. 4.*
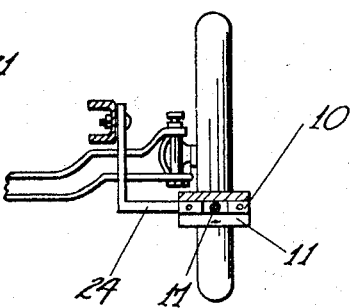
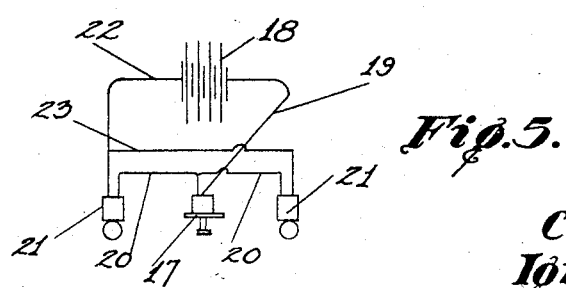
*Fig. 5.*
Charles V. Chuprin
Ignatius J. Chuprin
INVENTOR
BY *Victor J. Evans*
WITNESS:  ATTORNEY Patented May 20, 1930

1,759,299

UNITED STATES PATENT OFFICE

CHARLES V. CHUPRIN AND IGNATIUS J. CHUPRIN, OF MOUNT CARMEL, PENNSYLVANIA

LIGHT FOR MOTOR VEHICLES

Application filed March 8, 1929. Serial No. 345,355.

This invention relates to new and useful improvements in lighting devices for use upon motor vehicles in times of emergency to permit inspection and illuminate the wheel structures therefor.

An object of the invention contemplates the provision of a housing having multiple lamps sufficiently spaced apart to effectively illuminate both sides of an adjacent wheel structure.

An additional object of the invention embodies a switch member for each of the housings whereby each set of lights may be independently illuminated.

More specifically stated the housings are provided with cover plates to shut off the lens of the light members whereby the lens therefor will be maintained clean and clear.

With the above and other objects in view, the invention further consists of the following novel features and details of construction, to be hereinafter more fully described, illustrated in the accompanying drawing and pointed out in the appended claims.

In the drawing:—

Figure 1 is a side elevation of a motor vehicle equipped with the improved lighting device.

Figure 2 is a front elevation of one of the housings with the cover plate swung to open position.

Figure 3 is a longitudinal sectional view taken through one of the housings.

Figure 4 is a vertical sectional view taken through the motor vehicle chassis bar to illustrate the method of attachment of the housings therewith.

Figure 5 is a diagrammatic plan view of the wiring circuits for each of the sets of lamps in the housings.

Referring to the drawing in detail wherein like characters of reference denote corresponding parts, the reference character 10 indicates generally a relatively long box like housing having a cover plate 11 hingedly connected, as at 12, therewith to close the open end thereof. Said open end is filled by a compartment or chamber 13 having connection upon the side walls thereof with frames 14 engageable with the combined lamp casings and reflectors 15. Lens members 16 are employed within each of the combination lamp casings and reflectors 15 in each of the housings. By reason of the fact that the lights are arranged adjacent the ends of the housings and upon the opposite sides of the compartments or chambers 13, the opposite sides of wheel structures may be simultaneously illuminated whereby tire changing and repairs thereto may be made more easily at night time.

A switch member, such as indicated at 17, carried within the chambers or compartments 13, is in direct communication with a source of current 18 through a lead wire 19. Cables 20, having connection with the remaining contact in the switch 17, are connected terminally thereof with the lamp sockets 21, centrally disposed within each of the combination lamp casings and reflectors 15. The remaining pole of the source of current 18 completes the circuit with one of the lamp sockets through a wire 22 whereas a connecting wire 23 carried by the remaining contact of the companion lamp socket taps in on the wire 22 at any suitable point in the length thereof.

The particular wiring circuit facilites simultaneous illumination and extinguishment of the lamp sockets. Bracket arms 24, carried by the housing 10, are of substantial L-shape formation as evidenced from the illustration of our invention in Figure 4 of the drawing to facilitate attachment of same upon the frame or chassis bar of the vehicle and to dispose the housings beneath the running boards of the vehicle and to focus the lamps therein upon opposite sides of the wheels therefor.

The present invention does away with the customary employment of flashlights for this purpose and also the inconvenience of looking for it and holding same in position to properly illuminate the desired portion of the wheel.

The invention is susceptible of various changes in its form, proportions and minor details of construction, and the right is herein reserved to make such changes as properly fall within the scope of the appended claims.

Having thus described the invention, what is claimed is:—

1. A lighting device for the wheel structures of motor vehicles comprising housing members located adjacent the wheel structures therefor, lamp casings arranged adjacent the ends of the housing to illuminate opposite sides of the wheel structures, and switch compartments carried within each of the housings between the lamp casings.

2. A lighting device for the wheel structures of motor vehicles comprising elongated housing members horizontally disposed beneath the running boards therefor adjacent the wheel structures, lamp casings arranged adjacent the ends of the housing to focus light upon opposite sides of the wheel structures, switch members for the lamp casings disposed within compartments in the housings between the lamp casings, and cover plates for the housings closing the switch members and lamp casings.

In testimony whereof we affix our signatures.

CHARLES V. CHUPRIN.
IGNATIUS J. CHUPRIN.